United States Patent
Liu et al.

(10) Patent No.: US 8,767,704 B2
(45) Date of Patent: Jul. 1, 2014

(54) COMPRESSING HEADER DATA

(75) Inventors: Zhigang Liu, Coppell, TX (US); Khiem Le, Coppell, TX (US); Yousuf Saifullah, Flower Mound, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 2243 days.

(21) Appl. No.: 10/737,982

(22) Filed: Dec. 18, 2003

(65) Prior Publication Data

US 2005/0083944 A1    Apr. 21, 2005

Related U.S. Application Data

(60) Provisional application No. 60/511,662, filed on Oct. 17, 2003.

(51) Int. Cl.
*H04J 3/24* (2006.01)
*H04L 12/28* (2006.01)
*H04L 12/70* (2013.01)
*G06F 15/16* (2006.01)

(52) U.S. Cl.
USPC ... 370/349; 370/392; 370/395.1; 370/395.52; 370/474; 370/521; 709/238; 709/247

(58) Field of Classification Search
USPC ......... 370/349, 392, 395.1, 395.52, 474, 521; 709/238, 247; 348/14.13; 375/240
See application file for complete search history.

(56) References Cited

U.S. PATENT DOCUMENTS

| | | | | |
|---|---|---|---|---|
| 5,850,526 A * | 12/1998 | Chou | ............ | 709/247 |
| 6,608,841 B1 * | 8/2003 | Koodli | ............ | 370/474 |
| 6,618,397 B1 * | 9/2003 | Huang | ............ | 370/474 |
| 6,704,795 B1 * | 3/2004 | Fernando et al. | ............ | 709/237 |
| 6,708,166 B1 * | 3/2004 | Dysart et al. | ............ | 707/765 |
| 6,711,164 B1 * | 3/2004 | Le et al. | ............ | 370/392 |
| 6,754,231 B1 * | 6/2004 | Jonsson et al. | ............ | 370/474 |
| 6,856,599 B1 * | 2/2005 | Kroon | ............ | 370/236 |
| 7,058,728 B1 * | 6/2006 | Eklund | ............ | 709/247 |
| 7,193,996 B2 * | 3/2007 | Dobbins et al. | ............ | 370/392 |
| 7,554,981 B2 * | 6/2009 | Kecskemeti | ............ | 370/392 |
| 7,792,092 B1 * | 9/2010 | Olkkonen et al. | ............ | 370/352 |
| 2002/0118671 A1 * | 8/2002 | Staples et al. | ............ | 370/352 |
| 2004/0139070 A1 * | 7/2004 | Dysart et al. | ............ | 707/3 |
| 2004/0230583 A1 * | 11/2004 | Testa | ............ | 707/100 |
| 2007/0110046 A1 * | 5/2007 | Farrell et al. | ............ | 370/389 |

OTHER PUBLICATIONS

Ghyslain Pelletier, "RObust Header Compression (ROHC): Context Replication for ROHC Profiles", Network Working Group Internet-Draft, May 23, 2002, pp. 1-17.*

* cited by examiner

*Primary Examiner* — Alpus H Hsu
(74) *Attorney, Agent, or Firm* — Squire Sanders (US) LLP

(57) ABSTRACT

A method for compressing information in a communication system is provided. The method includes compressing first address data in a first packet stream by using second address data included in a second packet stream.

27 Claims, 2 Drawing Sheets

```
+------------+---------------+---------+
| prefix-len | trailing-bits | padding |
+------------+---------------+---------+
```

```
+------------+---------+----------------+
| prefix-len | padding | trailing-bytes |
+------------+---------+----------------+
```

```
|   16 bits  |       variable length          |
+------------+--------------------------------+
|   bitmask  |         byte sequence          |
+------------+--------------------------------+
```

COMPRESSING HEADER DATA

CROSS-REFERENCE TO RELATED APPLICATIONS

This application claims priority of U.S. Provisional Application Ser. No. 60/511,662, entitled, "Compressing Header Data," filed Oct. 17, 2003, the entire contents of which are incorporated herein by reference.

BACKGROUND OF THE INVENTION:

1. Field of the Invention

The present specification relates to compression of data in communication systems, and in particular to compression of address data of a data stream communicated via a data communication system.

2. Description of the Related Art

A communication system can be seen as a facility that enables communications between two or more entities such as user equipment and/or other nodes associated with the communication system. The communication may comprise, for example, communication of voice, data, multimedia and so on.

A communication system typically operates in accordance with a given standard or specification which sets out what the various entities associated with the communication system are permitted to do and how that should be achieved. For example, the standard or specification may define if a circuit switched service and/or a packet switched service is provided. Communication protocols and/or parameters which shall be used for various functions on the system, such as routing, addressing and message formats, may also be defined. In other words, a specific set of "rules" on which the communication can be based on needs to be defined to enable communication by means of the system.

Routing of data packets between entities of a communication system is an important function of packet switched communication systems. In packet switched systems such as the Internet Protocol (IP) based networks a packet stream is routed via the various entities to the destination address based on address information contained in the headers of the packets of the stream.

The header information may be compressed. Header compression is considered as being one of the key techniques to improve spectrum efficiency and performance over wireless links or other links with limited bandwidth. These improvements are believed to be especially important for enabling wireless use of Internet.

In the existing header compression schemes the configuration involves a compressor and decompressor. The compressor receives uncompressed IP packets, divides them into separate streams based on IP address (source address, destination address, or both of these addresses) and possibly other header information (e.g. protocol type of upper layer, source and/or port number of upper layer). For each packet stream, the compressor maintains a compressor context and uses it to compress headers of this packet stream. The header-compressed packets are then communicated from the compressor to the decompressor. Usually, each compressed packet carries an indicator (e.g. context identification) to indicate to the decompressor which context has been used to generate this compressed packet. The decompressor also maintains a decompressor context for each packet stream. Various context synchronization mechanisms are usually used to ensure that a compressed packet can be successfully decompressed. When receiving a header compressed packet sent by the compressor, the decompressor decompresses the header using the correct decompressor context, reassembles the entire packet with the decompressed header, and then forwards the uncompressed packet to next entity, for example to a upper layer, commonly to a local upper layer, or to the next node on the packet path to its destination.

Conventional header compression schemes thus divide packets into packet streams and then compress each packet stream using a compression context established for that stream between a compressor and its peer decompressor. IP addresses are then used to classify a packet stream. Because of this IP packets carrying different IP addresses will be compressed using separate contexts.

A technique called "context replication" has been proposed in the Internet Engineering Task Force (IETF) to allow a new packet stream to be compressed using context of another existing packet stream. This may reduce the synchronization overhead for the new stream when header fields of packets belonging to the two (i.e. the existing and new) streams have the same or similar values. Otherwise, the uncompressed values of those header fields would need to be sent from the compressor to the decompressor to establish context for the new packet stream.

However, replication of contexts cannot be used for handling of IP addresses in all occasions. In particular, the proposal may only allow the context replication of IP addresses only in circumstances where the address data is exactly same between the new and existing packet streams. If there is even a small difference between the addresses, the compressor has to send the address uncompressed. The proposal does not even recognise a case where two packet streams carry substantially similar, but not exactly the same, IP addresses. Therefore the proposal does not enable optimisation that is based on exploitation of the similarity of IP addresses. In other words, the current context replication methods of robust header compression are not able to compress together IP addresses carried in packet streams with almost similar but not identical IP addresses.

Embodiments of the present invention aim to address one or several of the above problems.

SUMMARY OF THE INVENTION

According to one aspect of the present invention, there is provided a method for compressing information in a communication system, the method comprising the step of compressing first address data in a first packet stream by using second address data included in a second packet stream.

According to another aspect of the present invention there is provided a communication system comprising a first node provided with a compressor for compressing address data and a second node provided with a decompressor for decompressing address data. The first node is configured to compress first address data in a first packet stream communicated via the first node by using second address data included in a second packet stream.

According to yet another aspect of the present invention there is provided node for communication system. The node comprises a compressor for compressing first address data in a first packet stream communicated via the node by using second address data included in a second packet stream.

According to a yet another aspect of the present invention there is provided a node for communication system. The node comprises a decompressor for decompressing first address data in a first packet stream communicated via the node by using second address data included in a second packet stream.

In more detailed form, the address data may comprise an Internet Protocol address included in a header of a packet.

The compression may be applied to address data comprising at least one of destination address and source address.

The communication system may be configured to determine if a difference between the first address data and the second address data meets a predefined condition.

The second address data may be used as a reference for the first address data.

The embodiments of the invention may advantageously reduce overhead associated with IP addresses during context initialization for header compression. The reduction may be significant for headers whose main content are the source and destination addresses. Foe example, in Ipv6 headers these take 32 bytes out of 40 bytes. The embodiments may also be beneficial for short-lived sessions. The proposed mechanism may be easily applied to various header compression schemes as a feature component. The compressor and decompressor may not require any additional memory, since a reference address required in certain embodiments is already stored in compression context of the existing compression schemes.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

The following describes in a way of examples how first addresses data carried in a packet stream may be compressed using the second addresses data carried in another packet stream. The described embodiment can be used to improve header compression efficiency for example when the two packet streams carry substantially similar but not exactly the same IP addresses. The substantially similar portion may comprise, for example, similar prefix.

Figure 1:
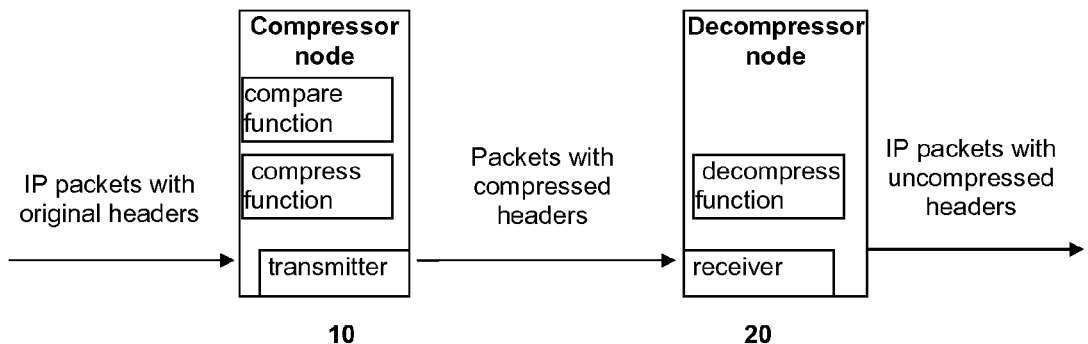
FIG. 1 shows a header compression configuration scheme.

In a possible scenario illustrated in FIG. 1 multiple packet streams having similar IP source and/or destination addresses pass through two nodes, respectively compressor node 10 and decompressor node 20, providing compressor and decompressor functions, respectively. The compression function may be provided, for example, in a mobile station (MS) communicating via a wireless interface. The decompression function may be provided in a network node on the other side of the wireless link provided for the mobile station. IP address(es) in an existing context of one packet stream passing through nodes 10 and 20 are used to compress the IP address(es) carried in packets belonging to another packet stream also passing through nodes 10 and 20.

In the following the address of the existing context i.e. the reference address is referred to as 'ref_addr'. The address of the packet stream wherein the compression is applied to, i.e. the address to be compressed is referred to as 'cur_addr'. The compressed address of the other packet stream, i.e. cur_addr, will be referred to as 'comp_addr'.

Figure 2:
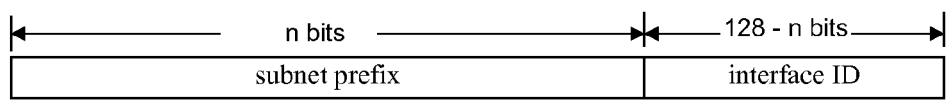
FIG. 2 shows a possible format for unicast addresses.
Figure 3:
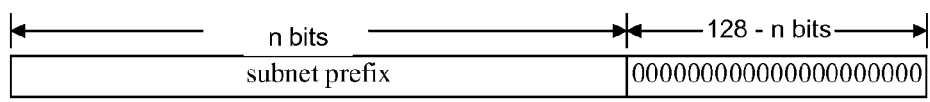
FIG. 3 shows a possible format for anycast addresses.
Figure 4:
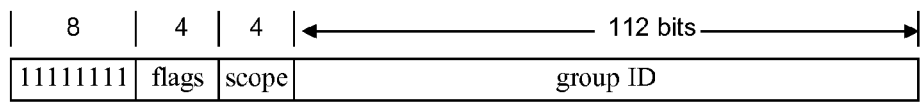
FIG. 4 shows a possible format for multicast addresses.

Examples of FIGS. 2 to 4 relate to the possible formats that may be used for various types of Ipv6 (Internet Protocol version 6) addresses. Those interested will find a detailed description of this exemplifying addressing scheme from RFC 3513 document "Internet Protocol Version 6 (IPv6) Addressing Architecture". It shall be appreciated that although particular benefits are expected in Ipv6 (Internet Protocol version 6) address compression, the embodiments can also be applied to other protocols and versions, for example Ipv4 (Internet Protocol version 4) address compression. A reasons for the difference in the expected gain between these exemplifying protocols is caused by the size of the address data—the size of IP addresses is 4 bytes for Ipv4 and 16 bytes for Ipv6.

In the following example it is assumed that the compressor node 10 knows that a) the reference context including the ref_adr is established on the decompressor side. Furthermore, it is assumed that b) a compressed packet has means to indicate to the decompressor whether cur_addr in this packet was compressed, and if yes, c) which ref_addr was used as the reference.

Assumption a) is a basic requirement in the current proposal for context replication in IETF. Implementation of assumption b) may require only two bits in the compressed header, one for source address and one for destination address, to indicate if the cur_addr in the packet is compressed. Implementation of assumption c) may also be based on the current proposal on context replication which already provides means to indicate the "base context" that is used to generate current packet. Therefore, no extra information is necessarily needed when compressing current source and destination addresses using the source and destination addresses, respectively, in the base context.

It shall be appreciated that the embodiments are not limited to this. In accordance with a possible alternative, an implementation may choose to have more flexibility, for example, to allow compression of a cur_addr (i.e. either source or destination address in the current packet) by using either the source or destination address in the base context. In that case, one more bit is needed for each cur_addr to indicate the ref_addr in the base context. There are many possibilities as where the aforementioned extra bits, if needed, can be located.

The compressor node 10 may provide two conceptual steps. In step 1 the compressor node 10 decides whether the cur_addr should be compressed using a given ref_addr. In step 2 the compressor node may then perform the actual compression of cur_addr using ref_addr as reference. These steps will now be explained in more detail.

It shall be appreciated that the two steps may not be separated in some practical applications. The step may be run in parallel processes or in a single process. Some parts of Step 2 may also be executed before Step 1.

Compressor Step 1—Decision

The decision may depend on the size of the address. For example, if the size of comp_addr is smaller than that of cur_addr or some threshold value set by implementation, then the compressor may decide that the cur_addr should be compressed using a given ref_addr. The threshold value may be even smaller than the size of the cur_addr.

Typically two factors affect the size of the comp_addr. One factor is the similarity in terms of bit pattern between the cur_addr and ref_addr. The other factor is the encoding overhead for the similarity.

The decision can be made in many ways. Some of the possibilities are discussed below. Note that the given examples are not mutually exclusive and can be combined in implementation.

Option 1: compress cur_addr using ref_addr and then compare the size of the addres after and before compression. If size of comp_addr<size of cur_addr, send the comp addr. Otherwise, send the uncompressed cur_addr.

Option 2: make the decision based on the similarity between cur_addr and ref_addr, without actually compressing cur_addr. This can be done very fast by applying the bitwse XOR (exclusive-or) operation on cur_addr and ref_addr. Lets consider X=cur_addr XOR ref_addr. A zero bit at position n of X means that the bit at corresponding position of cur_addr and ref_addr are identical. For example, in a scenario where an 8-bit address cur_addr=01010101 and ref_addr=01010100 then X=00000001, which means that the first 7 bits of cur_addr and ref_addr are the same but the last bit is different. In some implementations, this step may be part of the compression process and thus does not cause extra computation.

Option 3: make the decision based on knowledge about properties of headers to be compressed. For example, a compressor provided in a mobile station may know that any outbound packets will carry source IP address with same prefix that is 64 bits long.

Compressor Step 2—Compression

There are many possibilities to implement the required encoding format. Just a few of them are given below, these being for typical scenarios. In practice, an implementation may support multiple encoding formats and select one of them that yields the smallest comp_addr. In that case, an indicator may be needed either in the comp_addr or using spare bits in the compressed header to inform decompressor which format is used.

Figures 5, 6, 7, 8:
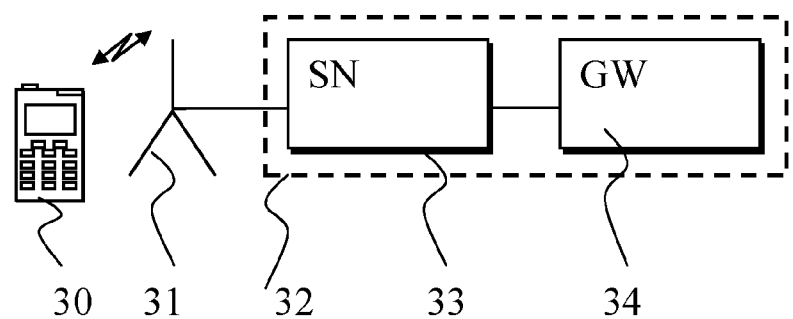
FIGS. 5 to 7 show address formats for various embodiments.
FIG. 8 shows a possible communication system wherein the invention may be embodied.

In accordance with a first possibility prefix match is used. A compressed IP address could look as shown in FIG. 5. A typical case might be that the cur_addr and ref addr have same prefix but different trailing bits.

The prefix-len field of the FIG. 5 address is indicative of the length, in units of bits, of the prefix that are same between cur_addr and ref_addr. Since the compressed address should at least have 1 bit prefix match, the value in this field is can be offset by 1 during interpretation. That is, a value of 0 (zero) in this field means 1 bit prefix match.

The trailing-bits field contains the (N—prefix-len) least significant bits in cur_addr, where N is the total length of IP address in units of bits. N=32 for Ipv4 and N=128 for Ipv6. Obviously, prefix-len<N.

The padding field of FIG. 5 is an optional field that may be used, for example, for byte alignment purpose. Its length is 0~7 bits and does not need to be explicitly indicated.

The prefix-len field can be encoded in many ways. The simplest method is linear encoding with fixed length. For example, 7 bits prefix-len field (which can cover value range of 128) should be enough for Ipv6 address compression. Other possible, but not limiting examples of suitable methods are variable length encoding or Huffman encoding. These encode the frequently occurring values with fewer bits, while use more bits to present other possible values.

A common configuration for Ipv6 addresses is 64 bits subnet prefix followed by 64 bits interface identifier. For example, the above referenced RFC 3513 specifies: "For all unicast addresses, except those that start with binary value 000, Interface IDs are required to be 64 bits long and to be constructed in Modified EUI-64 format". Therefore, this property may be employed in the embodiments by reserving the shortest code point (e.g. 1 bit) for this configuration. The 1-bit prefix-len indication can even be carried using a spare bit that may be available in the compressed header. In that case, the entire cur_addr will comprise only the 64 bits (or 8 bytes) interface ID, which has the good property of byte alignment.

Above format assumes compression is done at bit level. Alternatively, compression can be done at the byte level that may simplify encoding/decoding implementation and reduce processing time. A possible address header wherein the byte level compression may be applied is illustrated in FIG. 6.

The prefix-len field gives the length of the prefix in units of bytes that is the same between cur_addr and ref_addr. Note that the common case of 8 bytes (i.e. 64 bits) interface ID (identity) may be encoded more efficiently with the manner described above. For other general cases, fixed length linear encoding would probably be good enough for the prefix-len field, since it only takes 4 bits (or 2 bits) to encode Ipv6 (or Ipv4) address length.

The padding field is an optional field that may be present for byte alignment purpose, i.e., to make trailing-bytes field start at byte boundary. The padding field may also be used as a means to carry signals from the compressor to the decompressor.

The trailing-bytes filed gives the (N—prefix-len) least significant bytes in cur_addr, where N is the total length of IP address in units of bytes. N=4 for Ipv4 and N=16 for Ipv6.

Another possibility is to employ trailing bits/bytes match. For example, an Ipv6 node may use the same interface identifier to generate multiple Ipv6 addresses for that interface, such as link-local unicast address, site-local unicast address and global unicast address. All of these addresses may have the same trailing bits (i.e. the interface identifier) but different prefix. In this case, the compressor can use the same encoding methods as above, except that:

a) the prefix-len field should now be renamed to trail-len field and used to indicate the length of matched trailing bits/bytes; and b) the trailing-bits/bytes field should be renamed to prefix-bits/bytes field and used to carry the unmatched prefix bits/bytes.

A yet further possibility is to arbitrarily match pattern other than in the above two scenarios. Following is one possible encoding format for compression of Ipv6 addresses as shown in FIG. 7. It assumes compression is done at byte level. Since the encoding overhead (i.e. bitmask field) is 16 bits or 2 bytes, compression gains only if more than 2 bytes of cur_addr match those of ref_addr.

The bitmask field is used to indicate which byte in cur_addr matches that of ref_addr. If bit at position n is 0 (zero), cur_addr and ref_addr have same value at byte n. Otherwise, they differ at byte n. This field can be generated by applying XOR operation on cur_addr and ref_addr as described in Compressor Step 1 above, except that the XOR is now at byte level.

The byte sequence field is for carrying the original value of each unmatched byte, in the order as they appear in cur_addr. Obviously, each byte in the byte sequence field corresponds to a bit in the bitmask that has value of 1. Therefore, the decompressor can determine the total number of unmatched bytes (i.e. length of this field) and the position of each unmatched byte in the original cur_addr.

This encoding format may also be used for the above described prefix match or trailing bits/bytes match. This may, however, cause higher overhead than the encoding format described with these matches.

The operation of the decompressor will be described next by means of examples.

When receiving a packet with compressed header the decompressor may first check if the source and/or destination IP addresses in the packet have been compressed in accordance with the embodiments of the present invention. If yes, the decompressor may fetch the ref_addr referred to by the packet. If the source and destination addresses are both compressed, they may have used two different ref_addr, one for the source address and another one for the destination address. The decompressor may then regenerate the original IP address (cur_addr) using the corresponding ref_addr and the comp_addr carried in the packet. Specifically, the matched parts (as indicated in comp_addr) will be copied from ref_addr, and unmatched parts from comp_addr. The detailed decoding process depends on the encoding format as described above with reference to the exemplifying compression procedures.

Above described compressor/decompressor procedures are based on various kinds of "direct" differential encoding methods that encode the difference between cur_addr and ref_addr. Another approach could be based on "indirect" encoding. In this scenario the compressor may calculate X=cur_addr XOR ref_addr, and then compress X. As mentioned earlier in compressor step 1, X will reflect the similarity between cur_addr and ref_addr. Therefore, X will contain a sequence of zeros for each matched part between cur_addr and ref_addr. X can be compressed using various methods, e.g. run length encoding. The compressed X may be sent in the header compressed packet. Decompressor then decompresses X, and calculates (X XOR ref_addr). The result will be cur_addr.

Above method uses properties of the XOR function. That is, (a XOR b) XOR b=a, which holds for any value of a and b. In terms of compression efficiency, the approach probably will have similar or slightly less compression ratio than the direct encoding approach. However, it may be preferred in certain implementation where the compression of X can be done fast, for example by means of hardware based solutions. Since XOR operation is fast, that means the total compression/decompression time can be shorter than that of direct encoding approach.

FIG. 8 shows an example of a possible use environment of the embodiment. More particularly, certain elements of a mobile communication system are shown. Communication systems proving wireless communication for user equipment 30 are well known. An example of these systems is those based on cellular technology. In cellular systems, a base transceiver station (BTS) 31 or similar access entity serves wireless user equipment (UE) 30 known also as mobile stations (MS) via a wireless interface between these entities. A mobile communication system is typically arranged to serve a plurality of mobile user equipments usually via a wireless interface between the user equipment and at least one base station of the communication system. The mobile communication system may logically be divided between a radio access network (RAN) and a core network (CN) 32. The operation of the base station apparatus and other apparatus required for the communication can thus be controlled by one or several control entities. The various control entities may be interconnected. The communication on the wireless interface between the user equipment and the elements of the communication network, such as controller 33 can be based on an appropriate communication protocol. One or more gateway nodes 34 may also be provided for connecting the mobile network to other networks, for example to a public switched telephone network (PSTN) and/or other communication networks such as an IP (Internet Protocol) and/or other packet switched data networks. For example, if a requested service is provided by a service provider located in other network, the service request is routed via the mobile network to the other network and then to the service provider. Similarly, a message may be transported to a user in another network. The mobile user equipment 30 that is suitable for use in the above described embodiments may comprise any appropriate mobile user equipment adapted for Internet Protocol (IP) communication to connect the network. For example, the mobile user may access the cellular network by means of a Personal computer (PC), Personal Data Assistant (PDA), mobile station (MS) and so on. The following examples are described in the context of mobile stations.

In a typical mobile network a mobile station is allowed to dynamically change its source address. One of the reasons for allowing is privacy, for example, to make it more difficult for eavesdroppers and other information collectors to identify the MS based on IP address. The procedure is sometimes called as stateless address autoconfiguration. However, all of the source addresses used by the MS will have the same prefix as assigned by the gateway node, GGSN. That means for uplink (i.e. from the MS to the remote endpoint), multiple packet streams will have similar source address. For downlink (i.e. toward the MS), destination address will be similar.

A mobile router is another good example of the possible application. The mobile router is a mobile node that is responsible for one or more entire networks moving together, e.g., on an airplane, a ship, a train, an automobile, a bicycle, or a kayak. All of the nodes within the mobile network(s) have IP addresses with same prefix. When the mobile router is connected to other networks via a bandwidth-limited link, header compression is probably needed. A possible application in this context is the Personal Area Network (PAN). PAN may be connected to external networks through a mobile router and via low-bandwidth link. For example, a person can carry a group of BLUETOOTH™ devices which are connected to outside world through a mobile station, for example a mobile phone. Those devices may use IP addresses with same prefix. Header compression and thus this invention can be applied here.

A further exemplifying use is MS accessing multiple servers (e.g. a web servers) that have similar IPv6 address. In this case, the embodiments can be applied to destination address for uplink traffic and source address for downlink traffic. The gain is believed to be particularly significant for IPv6 header compression due to the large size, 16 bytes, of IPv6 addresses.

It shall be appreciated that the above list is not exhaustive. Various combinations of the above examples are also possible. For example, when a node belonging to a network served by a mobile router talks to multiple servers having similar Ipv6 addresses, this invention can be applied to destination and source IP addresses.

It should be appreciated that whilst embodiments of the present invention have been described in relation to mobile stations, embodiments of the present invention are applicable to any other suitable type of communication nodes.

It is also noted herein that while the above describes exemplifying embodiments of the invention, there are several variations and modifications which may be made to the disclosed solution without departing from the scope of the present invention as defined in the appended claims.

The invention claimed is:

1. A method for compressing information in a communication system, the method comprising:
   comparing first address data in a first message to second address data included in a second message to identify differences between the first and second address data;
   compressing, by a compressor, the first address data using the second address data based upon the comparison of the first address data and the second address data; and
   transmitting, sequentially, at least one packet of a first packet stream comprising the compressed first address data and at least one packet of a second packet stream comprising the second address data.

2. A method as claimed in claim 1, further comprising:
   providing the first address data and the second address data comprising an Internet Protocol address included in a header of a packet.

3. A method as claimed in claim 1, wherein the compressing is applied to the first address data comprising at least one of a destination address and a source address.

4. A method as claimed in claim 1, further comprising:
   determining if a difference between the first address data and the second address data satisfies a predefined condition.

5. A method as claimed in claim 4, further comprising:
   providing the predefined condition comprising a predefined level of similarity between the first address data and the second address data.

6. A method as claimed in claim 4, further comprising:
   satisfying the predefined condition with the first address data and the second address data having similar prefixes.

7. A method as claimed in claim 4, wherein the compressing comprises compressing the first address in response to a determination that the predefined condition is satisfied.

8. A method as claimed in claim 1, further comprising:
   using the second address data as a reference for the first address data.

9. A method as claimed in claim 8, further comprising:
   communicating from the compressor to a decompressor an indication that the second address data has been used as the reference for the first address data.

10. A method as claimed in claim 1, wherein the compressing further comprising:
    compressing the first address data to provide a compressed address data,
    comparing a size of the first address data with a size of the compressed address data, and
    using for transmission of an address data either the first address data or the compressed address data having a smaller size.

11. A method as claimed in claim 1, further comprising:
    sending information between two nodes regarding similarities of the first address data and second address data.

12. A method as claimed in claim 11, wherein the first address data and the second address data each comprises an Internet Protocol (IP) address and wherein the method further comprises:
    providing the information regarding similarity in prefixes of the IP addresses.

13. A method as claimed in claim 11, further comprising:
    providing the information regarding similarity in trailing bits or bytes of the first address data and the second address data.

14. A method as claimed in claim 1, wherein the first packet stream is transmitted over a wireless interface.

15. A method as claimed in claim 1, wherein the second address data is a compression key for the first address data.

16. A communication system, comprising:
    a first node comprising a compressor configured to compress address data, wherein the compressor is further configured to:
    compare first address data in a first message to second address data included in a second message to identify differences between the first and second address data, and
    compress the first address data using the second address data based upon the comparison of the first and the second address data, wherein at least one packet of a first packet stream comprising the compressed first address data and at least one packet of a second packet stream comprising the second address data are transmitted, sequentially, to a second node; and
    the second node comprising a decompressor configured to receive the first packet stream and a second packet stream and decompress the first address data using the second address data.

17. A communication system of claim 16, wherein the second address data is a compression key for the first address data.

18. A node for communication system, the node comprising:
    a compressor configured to
    compare first address data in a first message to second address data in a second message to identify differences between the first and second address data, and
    compress the first address data using the second address data based upon the comparison of the first address data and the second address data; and
    a transmitter configured to first transmit at least one packet of a first packet stream comprising the compressed first address data and to then transmit at least one packet of a second packet stream comprising the second address data.

19. A node for communication system of claim 18, wherein the second address data is a compression key for the first address data.

20. A node for communication system, said node comprising:
    a receiver configured to receive a first packet stream and a second packet stream, wherein the first packet stream comprises compressed first address data and the second packet stream comprises second address data, wherein the compressed first address data is based on a comparison of the first address data and the second address data to identify differences between the first and second address data; and
    a decompressor configured to decompress the compressed first address data using the second address data and the identified differences between the first and second address data.

21. A node for communication system of claim 20, wherein the second address data is a compression key for the first address data.

22. A computer program embodied on a non-transitory computer readable medium, the non-transitory computer readable medium storing code comprising computer executable instructions configured to control a processor for performing:
    comparing first address data in a first message to second address data included in a second message to identify differences between the first and second address data;
    compressing the first address data using the second address data based upon the comparison of the first address data and the second address data; and transmitting, sequentially, at least one packet of a first packet stream comprising the compressed first address data and at least one packet of a second packet stream comprising the second address data.

23. A computer program of claim 22, wherein the second address data is a compression key for the first address data.

24. A method for decompressing information in a communication system, the method comprising:

receiving, sequentially, at least one packet of a first packet stream and at least one packet of a second packet stream, wherein the first packet stream comprises compressed first address data and the second packet stream comprises second address data, wherein the compressed first address data is based on a comparison of the first address data and the second address data to identify differences between the first and second address data; and decompressing, by a decompressor, the compressed first address data using the second address data.

25. A method of claim 24, wherein the second address data is a compression key for the first address data.

26. A computer program embodied on a non-transitory computer readable medium, the non-transitory computer readable medium storing code comprising computer executable instructions configured to control a processor for performing:

receiving, sequentially, at least one packet of a first packet stream and at least one packet of a second packet stream, wherein the first packet stream comprises compressed first address data and the second packet stream comprises second address data, wherein the compressing comprises a comparison of the first address data and the second address data to identify differences between the first and second address data; and decompressing the compressed first address data using the second address data.

27. A computer program of claim 26, wherein the second address data is a compression key for the first address data.

* * * * *